(12) United States Patent
Just et al.

(10) Patent No.: US 6,609,873 B2
(45) Date of Patent: Aug. 26, 2003

(54) BULK MATERIAL UNLOADING FACILITY

(75) Inventors: William Wayne Just, Florence, SC (US); Robert E. Singleton, Jr., Florence, SC (US)

(73) Assignee: Carbis Incorporated, Florence, SC (US)

( * ) Notice: Subject to any disclaimer, the term of this patent is extended or adjusted under 35 U.S.C. 154(b) by 74 days.

(21) Appl. No.: 10/014,639

(22) Filed: Oct. 26, 2001

(65) Prior Publication Data

US 2003/0082017 A1 May 1, 2003

(51) Int. Cl.$^7$ .................................................. B65F 9/00
(52) U.S. Cl. ........................................ 414/390; 406/191
(58) Field of Search ................................ 406/191, 192, 406/193, 194, 195; 414/373, 390

(56) References Cited

U.S. PATENT DOCUMENTS

| | | | | |
|---|---|---|---|---|
| 2,580,215 A | * | 12/1951 | Bozich | 406/94 |
| 2,819,123 A | * | 1/1958 | Montgomery | 406/155 |
| 5,417,524 A | * | 5/1995 | Newton | 406/88 |

* cited by examiner

*Primary Examiner*—Joseph A. Dillon
(74) *Attorney, Agent, or Firm*—Charles L. Schwab; Nexsen Pruet Jacobs & Pollard, LLC

(57) ABSTRACT

A bulk material handling facility includes an unloading tube positionable for connection to several discharge openings of a transport vehicle without requiring repositioning of the vehicle. The unloading tube is pivotally supported so that it can be swung out of the way when not in use. The unloading tube may include an elevated portion permitting passage of personnel and equipment when the unloading tube is in use.

9 Claims, 3 Drawing Sheets

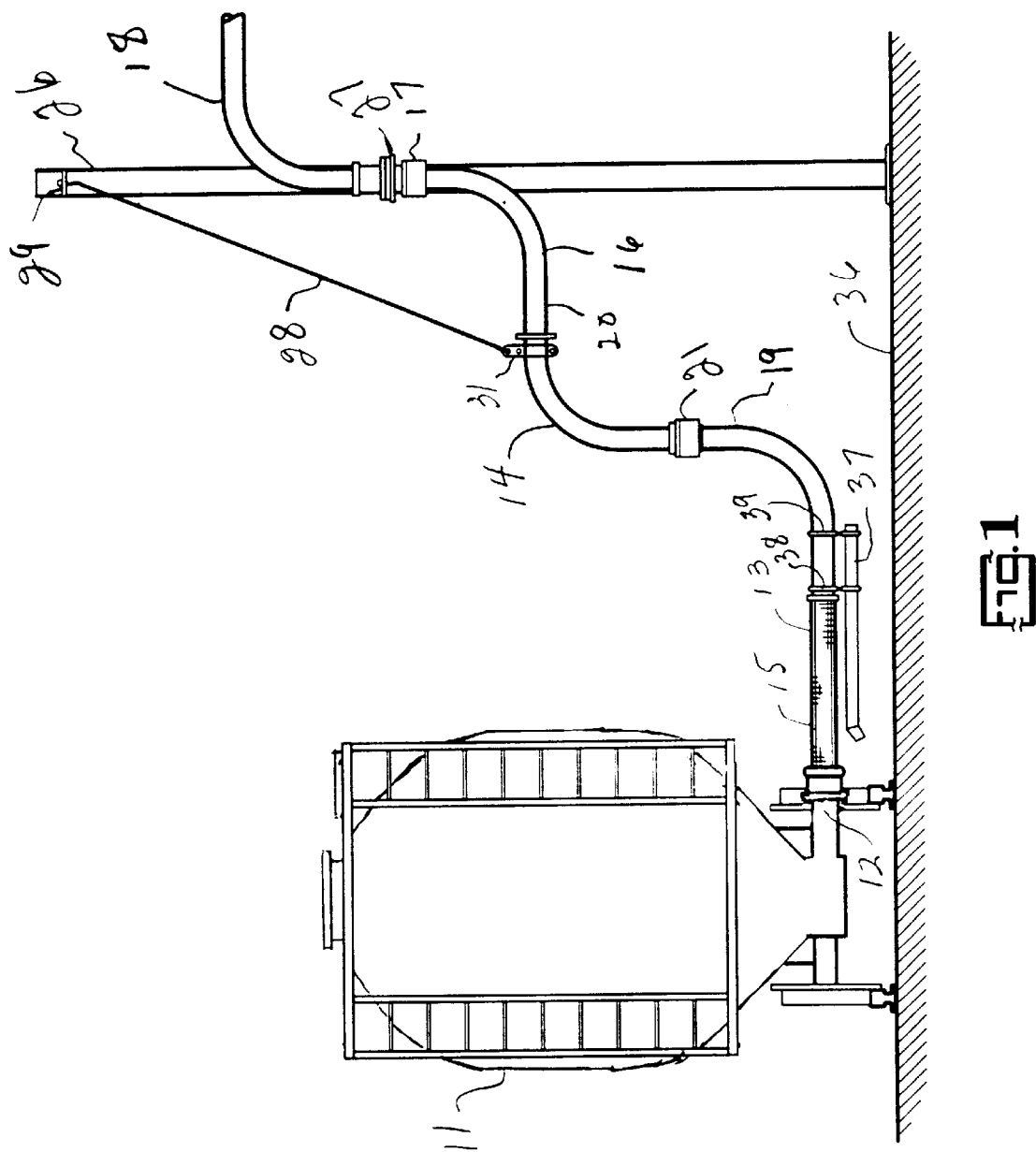

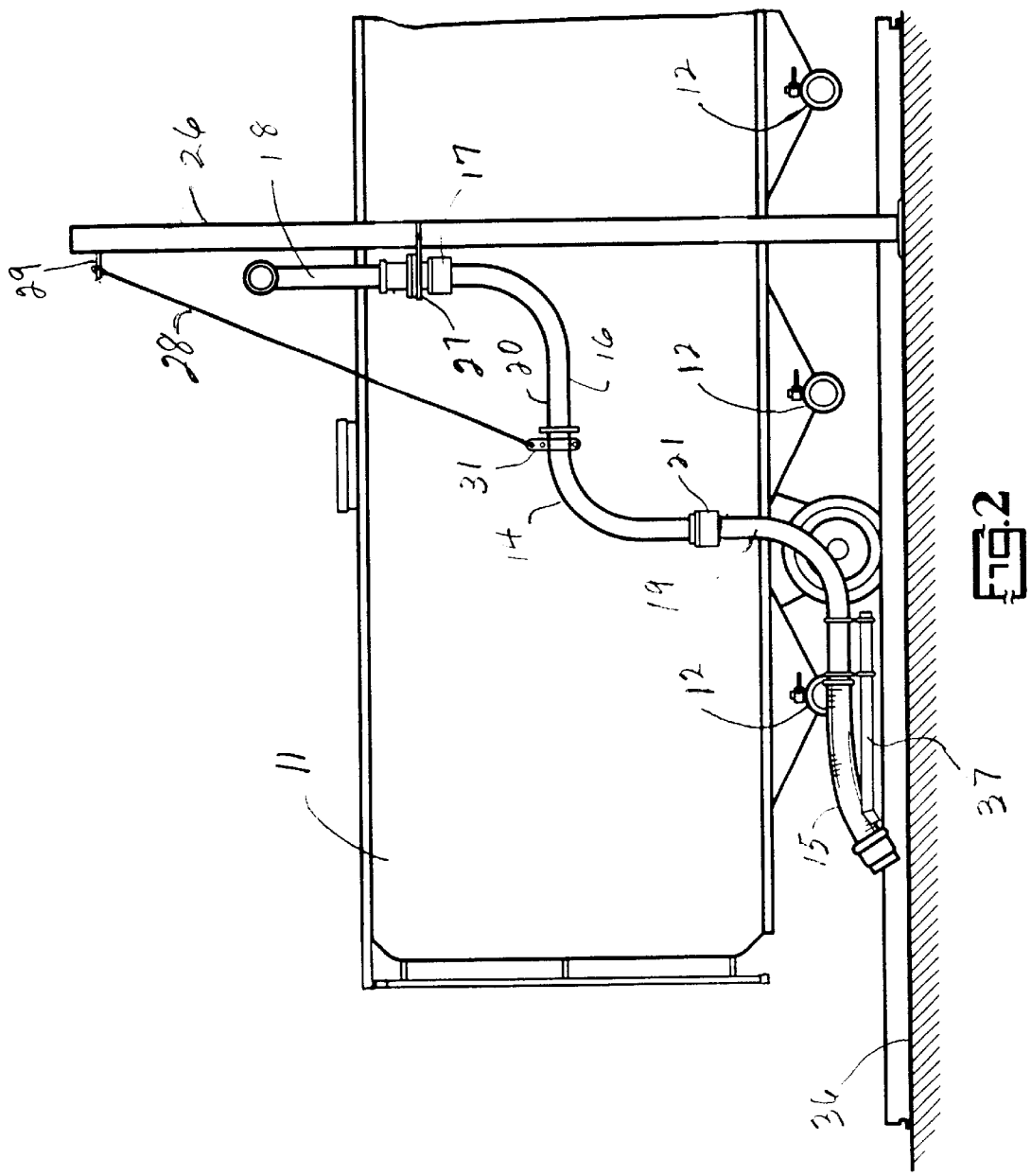

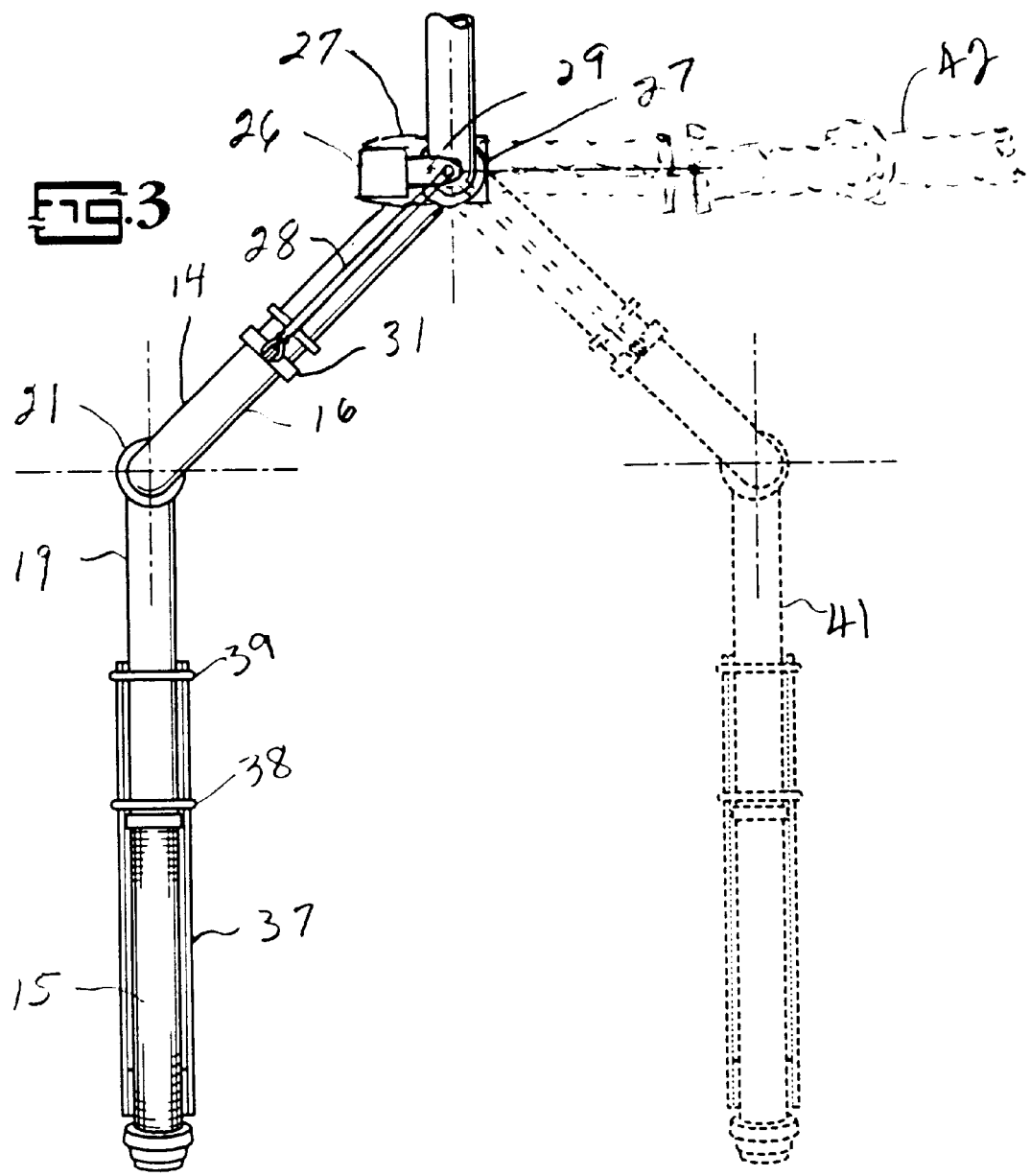

BULK MATERIAL UNLOADING FACILITY

TECHNICAL FIELD

This invention relates to a bulk material handling facility and more particularly to such a facility having an unloading tube that pivots between positions for selective connection to outlets of a bulk transport vehicle and a withdrawn position.

BACKGROUND OF THE INVENTION

Bulk material unloading stations have heretofore been provided for unloading bulk material from a bulk transport vehicle; however, the pipe line connection to the vehicle being unloaded restricted movement of personnel and equipment in the area at the unloading side of the vehicle. Also, when unloading vehicles with a plurality of discharge outlets spaced longitudinally of the vehicle, it was necessary to move the vehicle when switching from one discharge outlet to another.

OBJECTS AND SUMMARY OF THE INVENTION

It is an object of this invention to provide a bulk material unloading facility that includes an unloading tube that does not block movement of personnel and equipment in the unloading area when it is in use. It is a further object of this invention to provide an unloading tube which can be connected in sequence to any of several discharge outlets of a transport vehicle without requiring movement of the transport vehicle.

An unloading tube is supported for swinging movement about a vertical axis by a first pivot joint so that it can be moved from an out of the way storage position to bulk material unloading positions in which it is connectable to any one of several adjacent discharge openings of a bulk material transport vehicle. A flexible end part and a second vertical pivot joint in the unloading tube spaced horizontally from the first pivot joint facilitates selective connection of the unloading tube to a series of adjacent discharge openings of the bulk material transport vehicle. A portion of the unloading tube is elevated sufficiently to permit personnel to walk therebeneath. A support tray is employed to prevent the flexible end from engaging the ground when it is disconnected from a discharge opening of the transport vehicle and a support line extends downward at an angle from the support structure for the unloading tube and connects to the unloading tube at a point spaced horizontally from the first pivot joint. A second pivot joint may be provided in the unloading tube to further facilitate connection to discharge openings to the transport vehicle.

BRIEF DESCRIPTION OF THE DRAWINGS

One embodiment of the invention is illustrated in the accompanying drawings, in which:

FIG. 1 shows an end view of a bulk material transport vehicle connected to a bulk material unloading tube;

FIG. 2 is a side view showing the bulk material unloading tube disconnected from the bulk material transport vehicle and pivoted to an out of the way storage position; and FIG. 3 is a top view of the unloading tube shown in FIG. 1 showing various positions of the unloading tube.

DETAILED DESCRIPTION OF THE INVENTION

FIG. 1 shows a conventional land surface supported bulk material transport vehicle 11 in the form of a railroad tank car with one of its discharge openings 12 connected to a horizontally extending end section 13 of an unloading tube 14. The end section 13 terminates in a flexible tube part 15 with an end adapted for releasable connection to a discharge opening 12 of the transport vehicle. In addition to the end section 13, the unloading tube includes a double elbow shaped end section 16 having a vertically extending end pivotally connected by a first pivot joint or swivel 17 on a first vertical axis to a storage pipe line 18, a horizontally extending part 20 and a downwardly extending end which is pivotally connected by a second pivot joint or swivel 21 to an upstanding end 19 of the end section 13 for pivotal movement about a second vertical axis spaced horizontally from the vertical axis of the swivel 17. The unloading tube 14 is formed by rigid conduit components except for the flexible conduit part 15.

A support structure is provided for the unloading tube 14 in the form of a rigid stationary column 26 which includes a horizontally extending bracket 27 supporting the storage pipe line 18 and a stationary part of the swivel 17. The unloading tube 14 is additionally supported by a tension member 28, shown here in the form of a cable, connected at its upper end to a bracket 29 on the support column 26. The tension member 28 extends downwardly at an angle to the vertical and connects at its lower end to a bracket 31 rigidly secured to a horizontally extending part 20 of the section 16 of the unloading tube 14. The connection of the upper end of the tension member 28 to the bracket 29 is vertically aligned with the vertical axis of the swivel 17.

To prevent the flexible end part 15 of the unloading tube 14 from engaging the floor or ground surface 36, a support tray 37 is rigidly attached by support brackets 38, 39 to a rigid horizontal segment of the end section 13 in underlying relation to the flexible tube part 15. The support tray 37 is at a sufficient height above the floor 36 so that when the flexible tube part 15 is disconnected from a discharge opening 12, its end will rest in the trough shaped support tray 37, as illustrated in FIG. 2, without engaging the floor 36.

As shown in FIG. 1, the end section 16 of the unloading tube 14 includes the horizontally extending part 20 adjacent the support column 26 which is at a sufficient elevation to permit personnel and equipment to safely pass beneath the unloading tube 14 when the bulk transport vehicle 11 is being unloaded. When the unloading tube 14 is not in use, it may be pivoted to an inactive stored position as shown in FIG. 2, thus clearing the area between the support structure 26 and the bulk material transport vehicle 11.

FIG. 3 is a top view of the unloading tube 14 positioned for connection to a discharge opening of a bulk unloading vehicle. Broken lines 41 show an alternate position of the unloading tube in which it can be connected to a different discharge opening of the bulk material transport vehicle. Broken lines 42 shows the unloading tube moved to its out of the way stored position in which it is placed when not used to unload bulk material.

The unloading tube 14 is advantageously used to unload bulk material from land surface supported transport vehicles, such as the railroad tank car. The swivels 17, 21 and the flexible tube part 15 permit the unloading tube to be connected alternately to several discharge openings of the bulk material transport vehicle without requiring repositioning of the vehicle. By providing the swivel 17 and the tension member 28, the unloading tube 14 is easily moved manually to an out of the way, inactive stored position. The support tray 37 prevents the flexible conduit part 15 from engaging the floor or ground surface 36. The horizontally extending and elevated part 20 rigid conduit portion of the unloading tube 14 adjacent the support column 26 allows passage of personnel and equipment while the unloading tube 14 is being used in an unloading operation. This unloading tube contributes to production efficiency and to worker safety.

What is claimed is:

1. Apparatus facilitating transfer of bulk material from a land surface supported transport vehicle to a receiving pipe line comprising:
    a vertically extending support structure on said land surface,
    an unloading tube including
        a first end section pivotally connected to said receiving pipe line on a first vertical axis by a first swivel supported on said support structure, and
        a second end section having a horizontally extended end adapted for releasable connection to an outlet of a bulk material transport vehicle and an upstanding end,
        said first end section including a horizontally extending part of predetermined height above said land surface to permit personnel to walk upright there beneath and a downwardly extending part connected to said upstanding end of said second end section and
    a tension member having one end connected to said horizontally extending part of said first end section and its other end connected to said support structure at a point above and in substantial vertical alignment with said first swivel.

2. The apparatus of claim 1 and further comprising a second swivel pivotally interconnecting said downwardly extending part of said first end section to said upstanding end of said second end section on a second vertical axis.

3. The apparatus of claim 1 wherein said tension member is a cable.

4. The apparatus of claim 1 wherein said second section includes a rigid segment and a flexible end part.

5. The apparatus of claim 1 and further comprising a support try secured to said rigid segment of said second section, said support tray being disposed beneath said flexible end part.

6. The apparatus of claim 5 wherein said support tray curves downwardly at its free end to provide a surface to surface support for said flexible end part.

7. Apparatus facilitating transfer of bulk material from a land surface supported transport vehicle having discharge openings to a receiving pipe line comprising:
    a vertically extending support structure of said land surface,
    an unloading tube having a rigid conduit portion pivotally connected to said receiving pipe line by a swivel on a first vertical axis near said support structure and extending horizontally from said support structure to a flexible portion terminating in a receiving end adapted for selective connection to said discharge openings and
    a tension member having one end connected to said support structure at a point substantially in vertical alignment with said first vertical axis and having its other end connected to said rigid conduit portion of said unloading tube at a point spaced horizontally from said vertical axis,
    said unloading tube being pivotable at least 90 degrees about said first vertical axis between an out of the way storage position and unloading position.

8. The apparatus of claim 7 wherein said unloading tube includes a support tray rigidly secured to said rigid conduit portion and extending beneath said flexible conduit portion, said receiving end of said flexible conduit portion resting on said support try when said receiving end is not connected to one of said discharge openings.

9. The apparatus of claim 1 wherein said rigid conduit portion includes a second swivel having a second vertical axis spaced horizontally from said first vertical axis.

\* \* \* \* \*